United States Patent Office 2,845,358
Patented July 29, 1958

2,845,358

METHOD OF PRESERVING FRESH FROZEN PORK TRIMMINGS

Lloyd A. Hall and Harry L. Gleason, Chicago, Ill., assignors to The Griffith Laboratories, Inc., a corporation of Illinois No Drawing. Application August 29, 1955
Serial No. 531,299

4 Claims. (Cl. 99—194)

This invention relates to the inhibition or prevention of the development of rancidity and off-flavor in fresh meat that has been frozen and the resulting stabilized products.

Freezing is known to affect the flavor and stability of meat products deleteriously. In many cases the effect of freezing is simply a pronounced loss of flavor and the development of rancidity. In the case of fresh meat such as beef, pork, pork trimmings and other fresh meat products, it is well known there is a progressive development of off-odors and rancidity based upon the length of time the meat is in frozen storage. This is particularly true of pork trimmings where the fat content is especially higher than any other types of frozen meats. The freezing, in the case of pork trimmings, renders the meat after several months of frozen storage practically unusable and at the end of one year the off-flavor and rancidity are of such character that it is practically worthless in the manufacture of sausage.

In the case of fresh beef in frozen storage, while the rancidity development is much less than is evidenced in the pork trimmings, the off-flavor developed makes the material particularly objectionable for edible use.

Thus, it is indicated that fresh meat of any type which is placed in freezer storage loses much of its palatability. The off-flavors are particularly noted in the meat after it is removed from frozen storage and is thawed out before using. In many cases these objectionable properties are of such nature that the meat must be discarded and utilized in offal products which, of course, means there is a tremendous economic loss.

It is, therefore, the object of this invention to so treat fresh meat before it goes into cold storage that the product when removed and thawed for use is in the same palatable condition as it was before freezing.

It is another object of our invention to add approved antioxidant compositions to the fresh meat before it is placed in the freezers.

It is another object of our invention to provide a process by which fresh meat can be kept indefinitely in palatable condition in cold storage by a treatment with antioxidants before freezing.

It is still another object of our invention to provide a process for maintaining fresh meat in a desirous edible condition after freezing.

While there have been many antioxidant products developed, it has been our observation that no one has considered the treatment of fresh meat before it is frozen to stabilize its fresh condition. The use of antioxidants has been primarily limited thus far to the treatment of oils and fats and fatty food products in the manufacture of lard and other fatty materials. No consideration has been given to the large amount of fresh uncured meat which is made unpalatable and unusable because of off-flavors due not merely to rancidity development in the fat by oxidation, but also by an oxidation and deterioration of the protein content of the meat.

We have found that most of the approved antioxidants are effective in maintaining the fresh condition of meat after freezing. This can be done, for example, in the stabilization of pork trimmings by using the following composition:

*Example #1*

| | |
|---|---|
| Dextrose | 19 lbs. 9¼ oz. |
| Propyl gallate | 4 grams. |
| Lecithin | 14 grams. |
| Refined corn oil | 82 grams. |
| Anhydrous citric acid | 36 grams. |
| Propylene glycol | 54 grams. |
| Total | 20 lbs. |

The above formulation is used as follows:

Two pounds of the formula of Example #1 are added to 100 lbs. of fresh pork trimmings by mixing the trimmings thoroughly with the composition. These trimmings were then frozen and stored for one year. When they were removed from storage the organoleptic tests were the same as before the trimmings were frozen. The AOM value of the treated frozen sample was 16 hours. The AOM value of the untreated frozen sample was zero. The peroxide value of the control untreated sample was 10. The peroxide value of the treated sample was zero. The control sample was unpalatable being both rancid and with a definite off-flavor.

*Example #2*

Salt replaces the dextrose in Example #1.

*Example #3*

100 lbs. of fresh beef steaks are rubbed and sprinkled with 2 lbs. of the mixture of Example #1.

*Example #4*

100 lbs. of fresh beef steaks are rubbed and sprinkled with 2 lbs. of the mixture of Example #2.

*Example #5*

100 lbs. of fresh port trimmings are mixed with a solution of 1 oz. of a liquid antioxidant composition containing 6% propyl gallate, 4% citric acid, 20% butylated hydroxy anisole and 70% propyleneglycol in 1 qt. of water.

*Example #6*

100 lbs. of fresh pork trimmings are mixed with 1 oz. of an antioxidant composition of the following formula:

| | |
|---|---|
| Butylated hydroxy toluene | 20 lbs. |
| Butylated hydroxy anisole | 3 lbs. |
| Propyl gallate | 4 lbs. 6 oz. |
| Citric acid | 3 lbs. 8 oz. |
| Lecithin | 22 lbs. 8 oz. |
| Soy bean oil | 46 lbs. 10 oz. |
| Total | 100 lbs. |

*Example #7*

100 lbs. of beef steaks are dipped momentarily in and then sprayed with 1 oz. of antioxidant composition of Example #5 in 1 qt. of water.

*Example #8*

100 lbs. of beef steaks are dipped momentarily in antioxidant composition of Example #6 in which 1 oz. was mixed with 99 oz. of an edible oil such as corn oil, soy bean oil, etc. and then sprayed with 1 oz. of the antioxidant.

Taste tests on the frozen meat were made by taking the trimmings from the freezer, thawing them out, grinding them through a 3/16" plate in a sausage cutter, and making sausage patties and tasting them. An amazing variation between the control (untreated) trimmings and the treated trimmings was very noticeable by all of the tasters in the panel. The appearance of the treated trimmings was the same as before freezing. The appearance of the frozen untreated trimmings showed them to be of a purplish cast far inferior to the treated trimmings. This experiment indicated also that there is undesirable discoloration because of rancidity development and protein deterioration on freezing which are not evident when the trimmings are treated with antioxidant before being put into the freezer.

We have found that any approved antioxidant may be used for the purposes of this invention. This includes antioxidants which are synergistic mixtures of butylated hydroxy anisole (BHA), butylated hydroxy toluene (BHT), propyl gallate and lecithin citrate, in corn oil; synergistic antioxidants composed of butylated hydroxy anisole (BHA), monoglyceride citrate and propyl gallate, in corn oil; synergistic antioxidants containing propyl gallate, butylated hydroxy anisole (BHA), citric acid and propylene glycol; synergistic antioxidants containing in its composition nordihydroguaiaretic acid (NDGA) and any and all antioxidants which have been approved for use in edible fats and oils.

The results of our invention have shown that fresh meat products treated with an antioxidant may be frozen and kept as long as one year and six months in frozen storage without losing color, flavor or becoming rancid.

The foregoing detailed description has been given for clearness of understanding only, and no unnecessary limitations should be understood therefrom, as modifications will be obvious to those skilled in the art.

What is claimed is:

1. The method of preserving fresh frozen pork trimmings during extended passage of time up to one year without the development of rancidity of the fat content and off-flavor caused by deterioration of the protein content, which consists essentially in applying an antioxidizing amount of a pork compatible, nontoxic antioxidant, the antioxidant being combined with a working carrier comprising a compound of the class consisting of salt, sugar and edible oils, to unfrozen, uncured fresh pork trimmings, freezing said antioxidant-treated pork trimmings under deep freezing conditions, and maintaining the frozen pork trimmings in the stored frozen state for an extended period of time up to one year during which time the antioxidant penetrates into and through the interior of the pork, through action of the working carrier, said antioxidant being applied in an amount sufficient to exert an antioxidizing effect during the entire storage period.

2. The method as set forth in claim 1 in which the carrier is salt.

3. The method as set forth in claim 1 in which the carrier is sugar.

4. The method as set forth in claim 1 in which the carrier is an edible oil.

References Cited in the file of this patent

UNITED STATES PATENTS

| | | |
|---|---|---|
| 2,462,760 | Mitchell et al. | Feb. 22, 1949 |
| 2,541,572 | Coleman et al. | Feb. 13, 1951 |
| 2,553,533 | Komarik et al. | May 15, 1951 |
| 2,567,085 | Stoloff | Sept. 4, 1951 |
| 2,707,154 | Lehman et al. | Apr. 26, 1955 |

OTHER REFERENCES

"Food Technology," October 1949, pages 332 to 336, inclusive, article entitled Antioxidants In The Hemoglobin Catalyzed Oxidation of Unsaturated Fats, by Chang et al.

"Food Technology," November 1953, pages 429, 430, and 431, article entitled Antioxidant Treatment For Bacon, by Hanley et al.